United States Patent [19]
Koizumi

[11] 3,856,328
[45] Dec. 24, 1974

[54] SAFETY HARNESS SHOCK ABSORBER

[75] Inventor: Toshihiro Koizumi, Yokosuka, Japan

[73] Assignee: Nissan Motor Company, Limited, Yokohama, Japan

[22] Filed: Sept. 7, 1973

[21] Appl. No.: 394,987

[30] Foreign Application Priority Data
Sept. 9, 1972 Japan.............................. 47-105315

[52] U.S. Cl............................ 280/150 SB, 188/1 C
[51] Int. Cl............................................ B60r 21/10
[58] Field of Search............... 280/150 SB; 188/1 C; 297/386

[56] References Cited
UNITED STATES PATENTS

| 3,400,977 | 9/1968 | Jones | 280/150 SB |
|---|---|---|---|
| 3,409,327 | 11/1968 | Radke | 280/150 SB |
| 3,438,674 | 4/1969 | Radke | 188/1 C |
| 3,486,791 | 12/1969 | Stoffel | 280/150 SB |

Primary Examiner—Robert R. Song

[57] ABSTRACT

A seat belt or shoulder strap extending about movable and fixed pulleys in a block and tackle configuration, the movable pulley being yieldably movable toward the fixed pulley in response to an excessive deceleration or collision condition of a vehicle.

4 Claims, 5 Drawing Figures

PATENTED DEC 24 1974  3,856,328
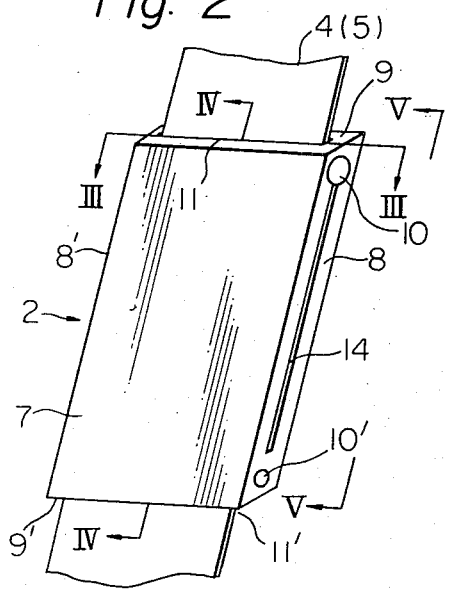
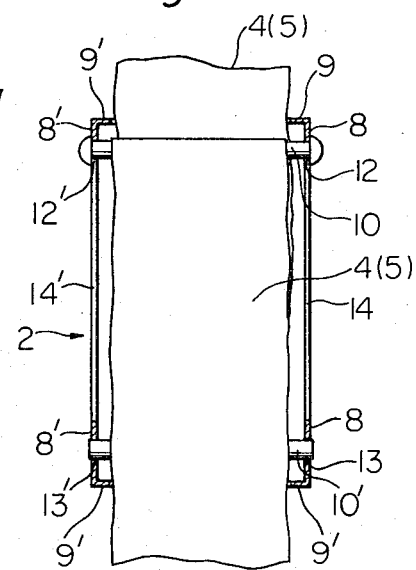
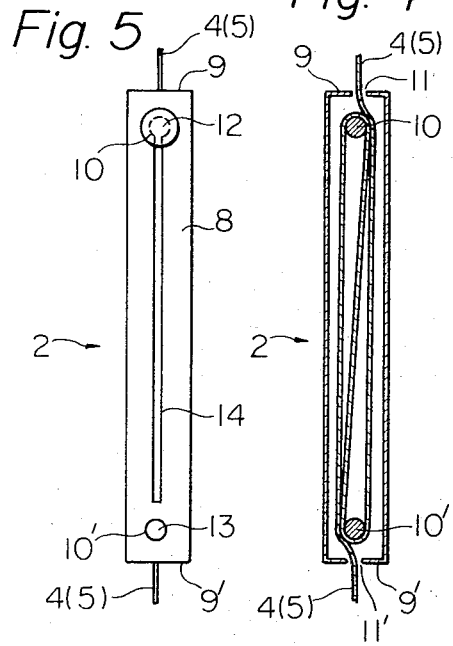
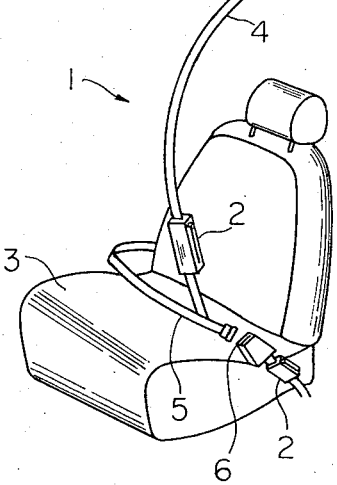

3,856,328

SAFETY HARNESS SHOCK ABSORBER

The present invention generally relates to a shock absorber, and more particularly to a shock absorber for a seat belt or shoulder strap of a safety harness for a vehicle occupant to absorb kinetic energy during a collision of excessive deceleration condition of the vehicle.

It is presently commonplace in aircraft, land vehicles and other power driven vehicles to provide some sort of restraining device for an occupant so that the occupant is protected from striking against the windshield, steering wheel or control column, instrument panel or other structural part of the vehicle in case of a collision or excessive deceleration condition. A safety harness provides such restraint for an occupant and usually takes the form of a seat belt or a shoulder strap or a combination of the two by which an occupant subjected to sudden deceleration is restrained. While a safety harness using a seat belt and/or shoulder strap has been effective for certain types of relatively minor decelerations of a vehicle, a safety harness has proved deficient for higher decelerations as experienced in many serious collisions. This known ineffectiveness is due at least partially to the insufficient energy absorption efficiency of a seat belt or shoulder strap which absorbs kinetic energy through forced elongation. However, since elongation of a seat belt or shoulder strap occurs appreciably later than the time at which deceleration is imparted to the occupant, a safety harness of the prior art does not lend itself to protecting the occupant at an incipient stage of the collision or abrupt deceleration condition. By reason of these drawbacks, a prior art safety harness having a seat belt and/or shoulder strap has failed to provide sufficient reliability in protecting an occupant during a collision or sudden stoppage of a vehicle.

Thus, there is a pressing need for an improved safety harness. The present invention contemplates resolution of these drawbacks which have thus far been inherent in a prior art safety harness of the seat belt type.

It is, accordingly, an important object of the present invention to provide an improved shock absorber for use with a safety harness which is capable of satisfactorily absorbing kinetic energy from a vehicle occupant in the event the vehicle undergoes excessive deceleration thereby protecting the occupant from injury or death.

Another object of the present invention is to provide an improved shock absorber for use with a safety harness which is simple in construction, economical to manufacture on a commercial production basis, and can easily be incorporated into various existing safety harnesses of the type having a seat belt and/or shoulder strap.

Still another object of the present invention is to provide an improved shock absorber for use with a safety harness which is highly reliable in operation.

Yet another object of the present invention is to provide an improved shock absorber for use with a safety harness which is compact in size and attractive in appearance.

A further object of the present invention is to provide an improved shock absorber for use with a safety harness which is capable of prolonging the expected life span of a seat belt and/or a shoulder strap of the safety harness.

According to the present invention, an improved shock absorber for use with a safety harness is provided which comprises movable and fixed pulleys about which a seat belt extends, and a casing having slots with widths smaller than the diameter of the movable pulley through which the movable pulley may be forced if the seat belt is subjected to a tension level above a predetermined value during a collision or excessive deceleration condition of the vehicle. These and other objects and advantages of a shock absorber for a safety harness according to the present invention will become more apparent from the following description taken in conjunction with the accompanying drawings in which like reference numerals and characters designate similar parts throughout the figures and in which:

FIG. 1 is a schematic perspective view showing an example of a safety harness incorporating a shock absorber according to the present invention;

FIG. 2 is a perspective view showing a preferred embodiment of a shock absorber according to the present invention;

FIG. 3 is a frontal view taken on a line III—III of FIG. 2;

FIG. 4 is a longitudinal sectional view taken on a line IV—IV of FIG. 2 showing the detailed configuration of a pulley mechanism which forms part of the shock absorber shown in FIGS. 2 and 3; and FIG. 5 is a side view taken on a line V—V of FIG. 2 showing a casing having formed therethrough an elongated slot to operatively engage with the pulley mechanism of FIG. 4.

Referring now to FIG. 1, there is schematically shown the general configuration of an example of a safety harness, generally designated by a reference numeral 1, comprising shock absorbers 2 according to the present invention. The safety harness 1 is shown as installed on a seat 3 of, for example, a motor vehicle or aircraft, and consists of a vertical shoulder strap 4 which includes a shock absorber 2, and a seat belt 5 which includes another shock absorber 2 and a buckle 6. A more detailed description of a preferred embodiment of a shock absorber 2 according to the present invention is illustrated in FIGS. 2 to 5.

As illustrated therein, the shock absorber 2 comprises a casing 7 which has side members 8 and 8' and end members 9 and 9', and a movable and a fixed pulley 10 and 10' respectively which are supported by the casing 7 as shown in FIG. 3. The end members 9 and 9' have formed therethrough elongated openings 11 and 11' respectively through which the shoulder strap 4 or the seat belt 5 passes (See FIG. 4). The side member 8 and 8' have formed therethrough holes 12, 12' and 13, 13 (See FIG. 3) which pivotally and supportably engage with the ends of the movable and fixed pulleys 10 and 10' respectively. The shock absorber 2 also comprises means to yieldably resist movement of the movable pulley 10 toward the fixed pulley 10' such as side members 8 and 8' which have linearly elongated slots 14 and 14' formed therethrough which terminate at the holes 12 and 12' respectively (See FIG. 5). The widths of the slots 14 and 14' are smaller than the diameter of the movable pulley 10. As shown especially in FIGS. 3 and 4, the shoulder strap 4 or the seat belt 5 extends about the movable and fixed pulleys 10 and 10'. It will accordingly be seen that the movable and fixed pulleys 10 and 10' and the shoulder strap 4 or the seat belt 5 form a sort of block and tackle mechanism.

It is to be appreciated that although the slots 14 and 14' are shown as having a linearly elongated form, they may have, for example, a sinuous form or taper inwardly away from the holes 12 and 12' in a reverse tapered form.

When, in operation, the vehicle and occupants are subjected to a sudden deceleration as during a collision condition, high tension is produced in the shoulder strap 4 and/or the seat belt 5 by the inertial force of an occupant who is flung forward against the safety harness 1. In response, due to the block and tackle arrangement of the strap 4 or belt 5 and the pulleys 10 and 10', the movable pulley 10 will be forced into and be moved through the length of the slots 14 and 14' if the level of tension in the strap 4 or belt 5 is above a predetermined valve Thus, impact or shock energy will be absorbed due to sliding friction of the movable pulley 10 in the slots 14 and 14' and deformation of the casing 7 due to the pulley 10 being forced through the slots 14 and 14'.

It should be appreciated from the foregoing description that a shock absorber according to the present invention has an increased impact or shock absorption effeciency and is capable of responding to an impact at a proper timing.

It is further to be appreciated that a shock absorber of the present invention is capable of prolonging the expected life span of a seat belt and/or shoulder strap of a safety harness.

While the principles of the present invention have now been made clear in a preferred embodiment, there will be immediately obvious to those skilled in the art many modifications of structure, arrangement, dimensions, elements, materials, and components used in the present invention which are particularly suitable for specific environments and operating requirements without departing from the scope of the invention. The appended claims are therefore intended to cover and embrace any such modifications within the limits only of the true scope of the present invention.

What is claimed is:

1. In a vehicle having a safety harness having at least one of a shoulder strap and a seat belt extending over a portion of a seat for restrining a vehicle occupant in the event of an excessive deceleration condition of the vehicle, a shock absorber for absorbing kinetic energy from the occupant caused by the excessive deceleration which comprises:

movable and fixed pulleys about which said at least one of a shoulder strap and a seat belt extends in a block and tackle configuration; and a casing for supporting said movable and fixed pulleys and comprising means to yieldably resist movement of said movable pulley toward said fixed pulley, said means comprising side members of said casing defining slots through which said movable pulley may be forcibly moved.

2. In a shock absorber as claimed in claim 1, said side members defining slots with a linearly elongated form.

3. In a shock absorber as claimed in claim 1, said side members defining slots with a sinuous form.

4. In a shock absorber as claimed in claim 1, said side members defining slots with a tapered form.

* * * * *